(12) United States Patent
Hayes et al.

(10) Patent No.: US 10,406,844 B1
(45) Date of Patent: Sep. 10, 2019

(54) CORRECTED STACK HEIGHT CALCULATION IN AN OUTPUT BIN

(71) Applicant: Hewlett-Packard Development Company, L.P., Houston, TX (US)

(72) Inventors: Alan Hayes, Vancouver, WA (US); Elliott Downing, Vancouver, WA (US); Bruce G. Johnson, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/967,422

(22) Filed: Apr. 30, 2018

(51) Int. Cl.
  *B42C 1/12* (2006.01)
  *H04N 1/00* (2006.01)
  *B65H 43/06* (2006.01)
  *B65H 37/04* (2006.01)
  *G03G 15/00* (2006.01)

(52) U.S. Cl.
  CPC .............. *B42C 1/12* (2013.01); *B65H 37/04* (2013.01); *B65H 43/06* (2013.01); *H04N 1/00631* (2013.01); *H04N 1/00639* (2013.01); *H04N 1/00716* (2013.01); *G03G 15/6582* (2013.01); *G03G 2215/00721* (2013.01); *G03G 2215/00738* (2013.01); *G03G 2215/00746* (2013.01); *G03G 2215/00827* (2013.01)

(58) Field of Classification Search
  CPC .......... B42C 1/12; B65H 37/04; B65H 43/06; H04N 1/00716; H04N 1/00631; H04N 1/00639; G03G 2215/00827; G03G 2215/00746; G03G 2215/00738; G03G 2215/00721; G03G 15/6582

USPC ........................................... 270/58.08, 58.09
See application file for complete search history.

(56) References Cited

U.S. PATENT DOCUMENTS

| | | | |
|---|---|---|---|
| 5,551,686 A | 9/1996 | Sanchez et al. | |
| 5,599,009 A | 2/1997 | Mandel et al. | |
| 5,603,492 A * | 2/1997 | Mandel | B65H 39/10 270/58.09 |
| 5,609,333 A * | 3/1997 | Mandel | B65H 39/11 270/58.09 |
| 5,823,529 A * | 10/1998 | Mandel | B65H 39/11 271/296 |
| 5,961,115 A * | 10/1999 | Blanck | B65H 43/06 270/52.06 |

(Continued)

FOREIGN PATENT DOCUMENTS

JP 2013082537 5/2013

*Primary Examiner* — Leslie A Nicholson, III
(74) *Attorney, Agent, or Firm* — Mannava & Kang

(57) ABSTRACT

According to examples, an apparatus may include a processor and a memory. The memory may have stored thereon machine readable instructions that when executed by the processor, may cause the processor to determine a job thickness of a print job including sheets, determine an average sheet thickness of the sheets, and determine an average print material coverage on the sheets. The instructions may also cause the processor to identify, based on the determined job thickness, the determined average sheet thickness, and the average print material coverage, a plurality of correction factors to be applied in a calculation of a corrected stack height of print jobs in an output bin and apply the identified plurality of correction factors to a measured stack height in the output bin to calculate the corrected stack height.

15 Claims, 7 Drawing Sheets

(56) References Cited

U.S. PATENT DOCUMENTS

| | | | | |
|---|---|---|---|---|
| 7,515,844 B2* | 4/2009 | Tanaka | ............... | G03G 15/0853 |
| | | | | 399/27 |
| 7,856,189 B2* | 12/2010 | Ishibashi | ............ | G03G 15/5062 |
| | | | | 399/258 |
| 7,976,018 B2 | 7/2011 | Ueda | | |
| 8,366,092 B2* | 2/2013 | Kwarta | .................. | B65H 45/18 |
| | | | | 270/20.1 |
| 8,561,983 B2* | 10/2013 | Takahashi | ............... | B65H 43/06 |
| | | | | 271/207 |
| 8,792,817 B2* | 7/2014 | Lawniczak | ........ | G03G 15/6594 |
| | | | | 270/58.08 |
| 2005/0280205 A1 | 12/2005 | Knierim | | |

\* cited by examiner

NON-TRANSITORY COMPUTER READABLE MEDIUM
600

DETERMINE A JOB THICKNESS OF A PRINT JOB INCLUDING SHEETS
602

DETERMINE AN AVERAGE SHEET THICKNESS OF THE SHEETS
604

DETERMINE AN AVERAGE PRINT MATERIAL COVERAGE ON THE SHEETS
606

DETERMINE WHETHER THE SHEETS ARE TO BE STAPLED TOGETHER
608

IDENTIFY A PLURALITY OF CORRECTION FACTORS TO BE APPLIED IN A CALCULATION OF A CORRECTED STACK HEIGHT OF PRINT JOBS IN AN OUTPUT BIN
610

CALCULATE THE CORRECTED STACK HEIGHT THROUGH APPLICATION OF THE IDENTIFIED PLURALITY OF CORRECTION FACTORS TO A MEASURED STACK HEIGHT IN THE OUTPUT BIN
612

*FIG. 6*

CORRECTED STACK HEIGHT CALCULATION IN AN OUTPUT BIN

BACKGROUND

Image forming apparatuses, including, printers, facsimiles, copiers, and multifunction printing devices may be equipped with a sheet discharge device that may stack sheets having images formed thereon in an output bin. The output bin may have a relatively large capacity to receive a large number of sheets.

BRIEF DESCRIPTION OF DRAWINGS

Features of the present disclosure are illustrated by way of example and not limited in the following figure(s), in which like numerals indicate like elements, in which:

FIG. 6. shows an example non-transitory machine-readable storage medium for calculating a corrected stack height through application of a plurality of correction factors to a measured stack height.

DETAILED DESCRIPTION

Figure 1:
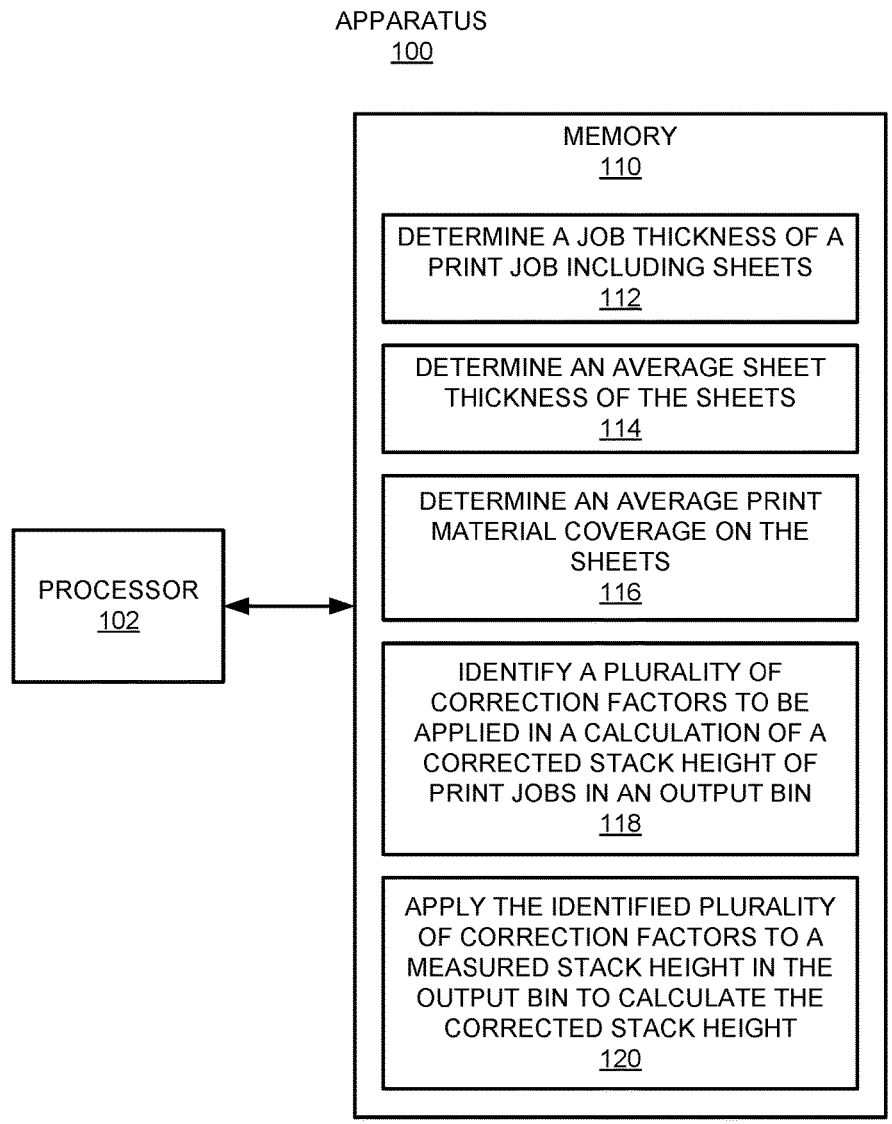
FIG. 1 depicts a block diagram of an example apparatus that may calculate a corrected stack height of sheets in an output bin.

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote one of a particular element or multiple ones of the particular element. As used herein, the term "includes" means includes but not limited to, the term "including" means including but not limited to. The term "based on" may mean based in part on.

Image forming apparatuses, including, printers, facsimiles, copiers, multifunction printing devices, and the like, may be equipped with a sheet discharge device that may stack sheets having images formed thereon in an output bin (or equivalently, output tray). The output bin may have a relatively large capacity to receive a large number of sheets. However, there may arise instances in which the number of sheets discharged into the output bin may approach or exceed the capacity of the output bin. In these instances, a media jam may occur at the sheet discharge device and/or a sheet may fall from the stack in the output bin. To prevent media jams and sheets from falling from the output bin, image forming apparatuses may be equipped with a sensor to detect a height of the stack of sheets in the output bin. The sensor may detect the height of a particular location on a top-most sheet in the stack. In addition, the detected height of the stack may be used to determine whether a print job is to be performed. For instance, if a determination is made that the output of the print job into the output bin will result in the stack exceeding a capacity of the output bin, the print job may be stopped.

In many instances, the stack of sheets may not be flat and thus the location at which the sensor detects the height of the top-most sheet may not be the highest location of the sheet. That is, following formation of images on the sheets, the sheets may curl in an non-uniform manner due to, for instance, differential moisture levels between the tops and the bottoms of the sheets, addition of ink onto the sheets, application of fusing energy and/or toner onto the sheets, etc. As a result, the actual highest level of the stack of sheets may be greater than the height detected through use of the sensor. As such, use of the sensor may result in an inaccurate measurement of the actual stack height, which may result in a determination that a larger bin capacity may remain than actually exists. Moreover, the inaccurate measurement may result in a media jam and/or a sheet falling from the output bin as a print job that may cause the media jam and/or sheet falling from the output bin may not be stopped from being performed.

Disclosed herein are apparatuses and methods for calculating a corrected stack height of sheets in an output bin of a printing system. In the apparatuses and methods disclosed herein, attributes of a print job, e.g., a number of sheets in the print job, a job thickness of the print job, an average sheet thickness of the sheets in the print job, an average print material coverage on the sheets, whether the sheets are to be stapled together, etc. may be determined. In addition, the attributes may be used to identify a plurality of correction factors to be applied in the calculation of the corrected stack height. That is, for instance, depending on the determined attributes, various correction factors may be added to the detected height of the stack of sheets in the output bin. The plurality of correction factors may include a staple correction factor, a staple location correction factor, a print material coverage correction factor, an orientation correction factor, a time correction factor, and the like.

According to examples, the corrected stack height may be more accurate than a measured stack height because the corrected stack height may compensate for the various attributes of the sheets in print jobs, whereas, the measured stack height may only detect the height at one location on the top sheet. The apparatuses and methods disclosed herein may also determine a more accurate remaining capacity in the output bin from the corrected stack height. In one regard, the apparatuses and methods disclosed herein may better model the thickness/height of a print job to allow for real time optimization of remaining bin capacity.

Through implementation of the apparatuses and methods disclosed herein, the remaining capacity in an output bin may accurately be calculated. As a result, a determination as to whether a print job that is to be performed is likely to cause a media jam and/or a sheet from falling from the output bin may accurately be determined. Thus, determinations as to when print jobs may be suspended to avoid a media jam and/or a sheet from falling from the output bin may be made accurately.

Figure 2:
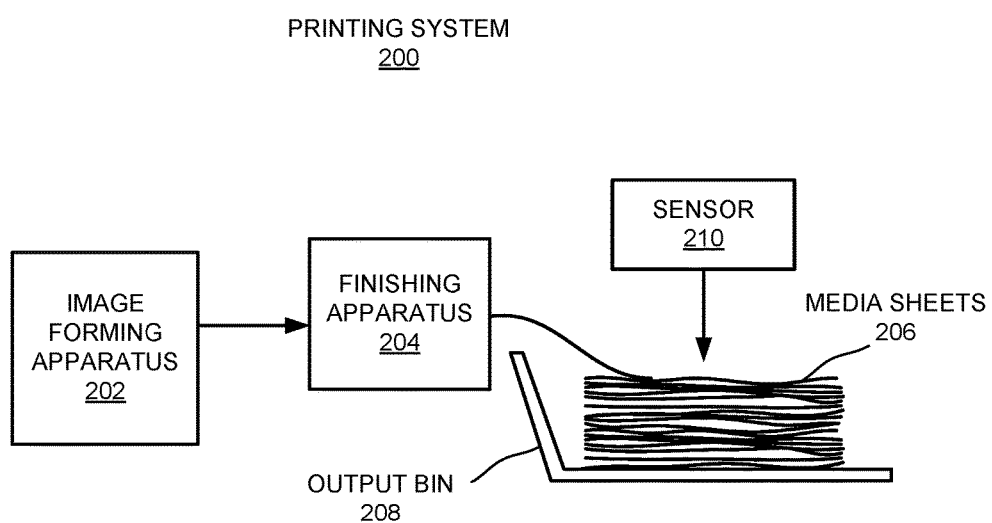
FIG. 2 depicts a block diagram of an example printing system within which the apparatus depicted in FIG. 1 may be implemented.

Reference is first made to FIGS. 1 and 2. FIG. 1 shows a block diagram of an example apparatus 100 that may calculate a corrected stack height of sheets in an output bin. FIG. 2 shows a block diagram of an example printing system 200 within which the apparatus 100 may be implemented. It should be understood that the example apparatus 100 depicted in FIG. 1 and/or the printing system 200 depicted in FIG. 2 may include additional features and that some of the features described herein may be removed and/or modified without departing from the scopes of the apparatus 100 and/or the printing system 200.

According to examples, the apparatus 100 depicted in FIG. 1 may be a computing device, a server, a laptop computer, or the like. In addition, or in other examples, the apparatus 100 may be a control system of the printing system 200 depicted in FIG. 2. That is, for instance, the apparatus 100 may be part of an image forming apparatus 202 or a finishing apparatus 204 in the printing system 200. Generally speaking, the image forming apparatus 202 may including printing components as well as other components for forming images onto sheets 206 of media and may convey the sheets 206 on which images have been formed to the finishing apparatus 204. In addition, the finishing apparatus 204 may perform a finishing operation on the sheets 206 prior to outputting the sheets into an output bin 208. The finishing operation may include, for instance, a stapling operation, a collating operation, an aligning operation, a binding operation, and/or the like.

In some examples, the image forming apparatus 202 may be a laser printing apparatus in which the printing components may apply toner onto the sheets 206 to form the images. In other examples, the image forming apparatus 202 may be an inkjet printing apparatus in which the printing components may apply ink onto the sheets 206 to form the images. In still other examples, the image forming apparatus 202 may be other types of printing apparatuses. In any of these examples, the image forming apparatus 202 may include a heater or dryer to fuse the toner onto the sheets or to dry the ink on the sheets 206 prior to the sheets being conveyed to the finishing apparatus 204. In some examples, the finishing apparatus 204 may be omitted and the image forming apparatus 202 may output the sheets 206 with the formed images directly into the output bin 208.

As shown in FIG. 1, the apparatus 100 may include a processor 102 that may control operations of the apparatus 100. In some examples, the processor 102 may control various operations, such as, printing by the printing components, performing finishing operations, and/or the like. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, the apparatus 100 may include multiple processors 102 without departing from a scope of the apparatus 100.

The apparatus 100 may also include a memory 110 that may have stored thereon machine readable instructions 112-120 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to determine a job thickness of a print job that includes sheets 206 of media. In some examples, the finishing apparatus 204 may include a module, e.g., a leading edge clamp module, that may measure the thickness of each sheet 206 coming into the finishing apparatus 204 from the image forming apparatus 202. In these examples, the processor 102 may receive the measured thicknesses of the sheets 206 in a print job and may calculate the job thickness from the received thicknesses. In other examples, the processor 102 may determine the job thickness from other measured thicknesses, e.g., from user-inputted types of media, from a sensor, etc.

The processor 102 may fetch, decode, and execute the instructions 114 to determine an average sheet thickness of the sheets in the print job. The processor 102 may determine the average sheet thickness through a calculation of the determined job thickness divided by the number of sheets in the print job.

The processor 102 may fetch, decode, and execute the instructions 116 to determine an average print material coverage on the sheets 206 in the print job. The print material may be toner, ink, or other material that may be used to form images on the sheets 206. The processor 102 may determine the print material coverage on the sheets 206 and may determine the average print material coverage based on the determined print material coverage on the sheets 206. In some examples, the processor 102 may determine the print material coverage on each of the sheets in the print job directly from a file identifying the images to be printed onto the sheets and/or from tracking the amount of print material applied onto the sheets.

In addition or in other examples, the speeds at which the printed sheets move through the image forming apparatus 202 may be tracked, e.g., the average speed at which the sheets moved through the printing system 200 may be determined. In addition, the average speed at which the sheets moved through the printing system 200 may be used to determine the print material coverage on the sheets. That is, for instance, there may be a correlation between the speeds at which the printed sheets move through the image forming apparatus 202, e.g., are outputted to the finishing apparatus 204, and the amount of print material coverage on the sheets. For instance, printed sheets that have a greater amount of print material coverage may be moved through the image forming apparatus 202 at a relatively slower rate than printed sheets that have a smaller amount of print material coverage. That is, a greater amount of heat, e.g., a greater amount of time adjacent to a dryer or heater, may be applied to printed sheets that have a greater amount of print material coverage and thus may be moved at a slower rate. In these examples, the processor 102 may determine the average print material coverage on the sheets 206 based on the correlation between the determined average speed and the average print material coverage.

The processor 102 may fetch, decode, and execute the instructions 118 to identify, based on the determined job thickness, the determined average sheet thickness, and the average print material coverage, a plurality of correction factors to be applied in a calculation of a corrected stack height of print jobs in the output bin 208. As discussed herein, the processor 102 may identify various correction factors to be applied in the calculation based on the determined job thickness, the determined average sheet thickness, and the average print material coverage. The processor 102 may also identify correction factors to be applied in the calculation based on additional aspects of the sheets 206 in the print job.

The processor 102 may fetch, decode, and execute the instructions 120 to apply the identified plurality of correction factors to a measured stack height in the output bin 208 to calculate the corrected stack height. As shown in FIG. 2, the printing system 200 may include a sensor 210 that may detect the height of the stack of media sheets 206. The sensor 210 may also detect when the output bin 208 is empty. The sensor 210 may be an optical sensor, a physical sensor, or the like, and may measure the height of the stack of sheets 206 in the output bin 208. According to examples, the processor 102 may access the measured stack height, e.g., may determine and/or fetch the measured stack height, and may sum the identified plurality of correction factors to the measured stack height in the output bin 208 to calculate the corrected stack height. In one regard, the corrected stack height may compensate for the curl as well as other changes that may occur in the sheets 206 following the printing and drying of print material onto the sheets 206.

The processor 102 may use the corrected stack height to determine the remaining capacity in the output bin 208. That is, for instance, the processor 102 may subtract the corrected stack height from a capacity height of the output bin 208 to determine the remaining capacity. In addition, the processor 102 may determine whether there is sufficient capacity in the output bin 208 for a next print job and if not, the processor 102 may halt the next print job until some or all of the sheets 206 in the output bin 208 are removed.

Instead of the machine-readable storage medium 110, the apparatus 100 may include hardware logic blocks that may perform functions similar to the instructions 112-120. In other examples, the apparatus 100 may include a combination of instructions and hardware logic blocks to implement or execute functions corresponding to the instructions 112-120. In any of these examples, the processor 102 may implement the hardware logic blocks and/or execute the instructions 112-120. As discussed herein, the apparatus 100 may also include additional instructions and/or hardware logic blocks such that the processor 102 may execute operations in addition to or in place of those discussed above with respect to FIG. 1.

Figure 3:
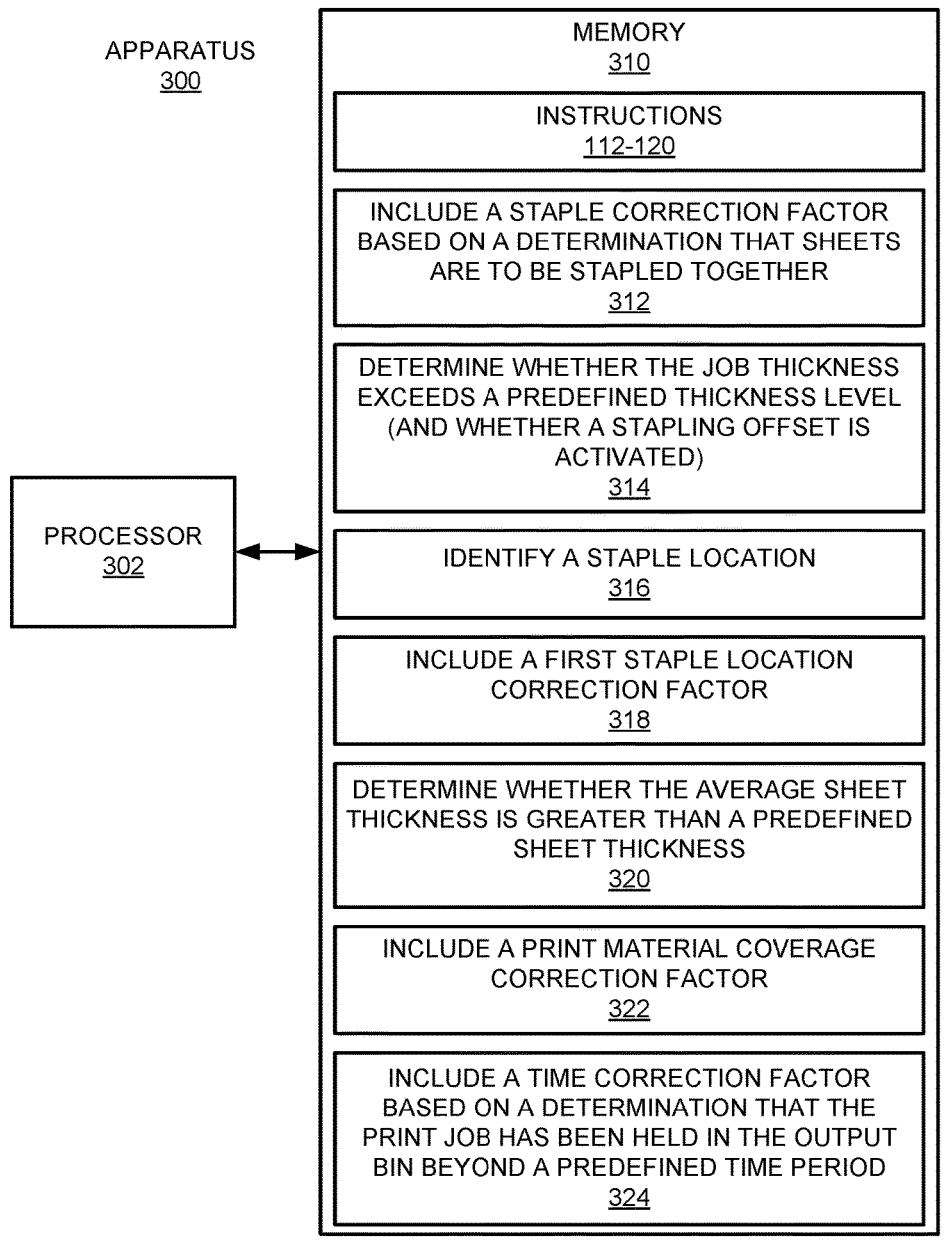
FIG. 3 shows a block diagram of another example apparatus that may calculate a corrected stack height of sheets in an output bin.

Reference is now made to FIG. 3, which shows a block diagram of another example apparatus 300 that may calculate a corrected stack height of sheets 206 in an output bin 208. It should be understood that the example apparatus 300 depicted in FIG. 3 may include additional features and that some of the features described herein may be removed and/or modified without departing from the scopes of the apparatus 300. The description of the apparatus 300 is also made with reference to FIGS. 1 and 2.

According to examples, the apparatus 300 may be a computing device, a server, a laptop computer, or the like. In addition, or in other examples, the apparatus 300 may be a control system of the printing system 200 depicted in FIG. 2. That is, for instance, the apparatus 100 may be part of the image forming apparatus 202 or the finishing apparatus 204 in the printing system 200.

As shown in FIG. 3, the apparatus 300 may include a processor 302 that may control operations of the apparatus 300. In some examples, the processor 302 may control various operations, such as, printing by the printing components, performing finishing operations, and/or the like. The processor 302 may be a semiconductor-based microprocessor, a central processing unit (CPU), an application specific integrated circuit (ASIC), a field-programmable gate array (FPGA), and/or other suitable hardware device. Although the apparatus 300 has been depicted as including a single processor 302, the apparatus 300 may include multiple processors 302 without departing from a scope of the apparatus 300.

The apparatus 300 may also include a memory 310 that may have stored thereon machine readable instructions 112-120 and 312-324 (which may also be termed computer readable instructions) that the processor 302 may execute. The memory 310 may be an electronic, magnetic, optical, or other physical storage device that contains or stores executable instructions. The memory 310 may be, for example, Random Access memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The processor 102 may fetch, decode, and execute the instructions 112-120 as discussed above with respect to FIG. 1. The processor 102 may also fetch, decode, and execute the instructions 312-324 as part of the instructions 118 to identify the plurality of correction factors to be applied. In addition, the processor 102 may execute the instructions 120 to apply the identified plurality of correction factors.

The processor 102 may fetch, decode, and execute the instructions 312 to determine whether these sheets in a print job are to be stapled together and based on a determination that the sheets are to be stapled together, include a staple correction factor in the identified plurality of correction factors. The staple correction factor may compensate for inclusion of a staple in the printed sheets of the print job. By way of particular example, the staple correction factor may correspond to a thickness of a staple, for instance, around 0.8 mm.

In some examples, the processor 102 may execute the instructions 312 to, based on a determination that the sheets are to be stapled together, determine whether the job thickness exceeds a predefined thickness level. In these examples, the processor 102 may include the staple correction factor in the identified plurality of correction factors based on a determination that the job thickness falls below the predefined thickness level. In addition, based on a determination that the job thickness exceeds the predefined thickness level, the processor 102 may not include the staple correction factor in the identified plurality of correction factors. The predefined thickness level may be based upon empirical data, for instance, which may be determined through testing of various job thicknesses and the effects on the heights by staples. By way of particular example, the predefined thickness level may be around 1 mm.

The processor 102 may fetch, decode, and execute the instructions 314 to determine whether the job thickness exceeds a predefined thickness level. The processor 102 may also execute the instructions 314 to determine whether a stapling offset is activated for the finishing apparatus 204. In instances in which the stapling offset is activated, the finishing apparatus 204 may apply staples at a plurality of staple locations that are offset with respect to each other on multiple print jobs. Based on a determination that the job thickness falls below the predefined thickness level and that the stapling offset is activated, the processor 102 may fetch, decode, and execute the instructions 316 to identify a staple location of a plurality of staple locations for the print job.

In addition, the processor 102 may fetch, decode, and execute the instructions 318 to include a first staple location correction factor of a plurality of staple location correction factors for the print job as a factor in the identified plurality of correction factors. Each of the plurality of staple location correction factors may correspond to a particular staple location. Thus, a different staple location correction factor may be applied based on the location of the staple on the sheets of the print job. In addition, each of the plurality of staple location correction factors may correspond to a thickness of a staple, for instance, around 0.8 mm.

The processor 102 may fetch, decode, and execute the instructions 320 to determine whether the average sheet thickness of the print job exceeds a predefined sheet thickness. The predefined sheet thickness level may be based upon empirical data, for instance, which may be determined through testing of various sheet thicknesses and the effects on the curling of the sheets 206. By way of particular example, the predefined sheet thickness may be around 0.2 mm.

The processor 102 may also determine whether the average print material coverage on the sheets in the print job falls below a predefined minimum print material coverage. The predefined minimum print material coverage may be based upon empirical data, for instance, which may be determined through testing of various print material coverage levels and the effects on the curling of the sheets 206. Based on a determination that the average print material coverage exceeds the predefined minimum print material coverage, the processor 102 may fetch, decode, and execute the instructions 322 to include a print material coverage correction factor that compensates for print material coverage as a factor in the identified plurality of correction factors. By way of example, the print material coverage correction factor may be a job thickness multiplied by a constant, such as 3. In examples, the print material coverage correction factor may be based upon a number of considerations, for instance, the components in the image forming apparatus 202, the components in the finishing apparatus 204, the print materials used, the sheet materials used, etc.

The processor 102 may fetch, decode, and execute the instructions 324 to determine whether the print job has been held in the output bin 208 beyond a predefined time period. The predefined time period may be user-defined, based on empirical testing, or the like. Based on a determination that the print job has been held in the output in 208 beyond the predefined time period, the processor 102 may include a time correction factor that compensates for the print job being held on the output bin 208 beyond the predefined time period as a factor in the identified plurality of correction factors.

Instead of the machine-readable storage medium 310, the apparatus 300 may include hardware logic blocks that may perform functions similar to the instructions 112-120 and 312-324. In other examples, the apparatus 300 may include a combination of instructions and hardware logic blocks to implement or execute functions corresponding to the instructions 112-120 and 312-324. In any of these examples, the processor 302 may implement the hardware logic blocks and/or execute the instructions 112-120 and 312-324. As discussed herein, the apparatus 300 may also include additional instructions and/or hardware logic blocks such that the processor 302 may execute operations in addition to or in place of those discussed above with respect to FIG. 3.

Figure 4:
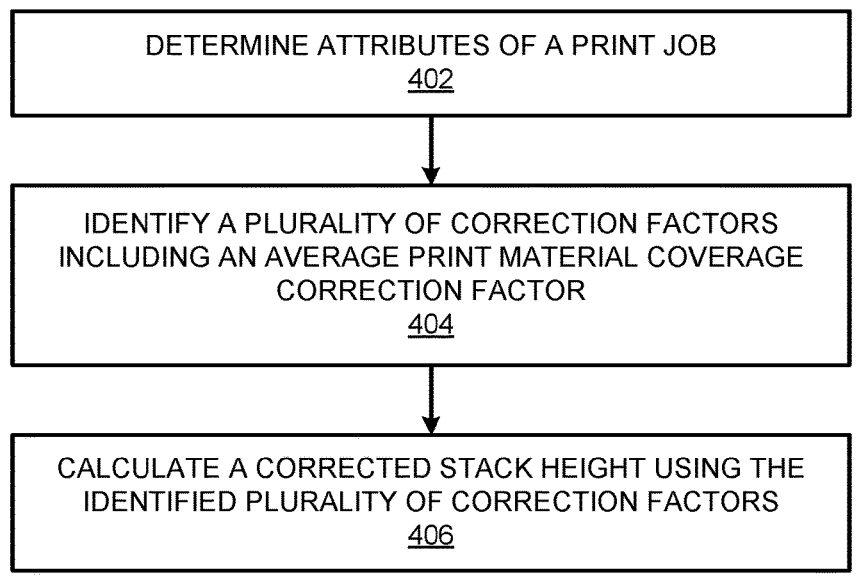
FIGS. 4 and 5A-5B, respectively, depict flow diagrams of example methods for calculating a corrected stack height using an identified plurality of correction factors.
Figure 5A:
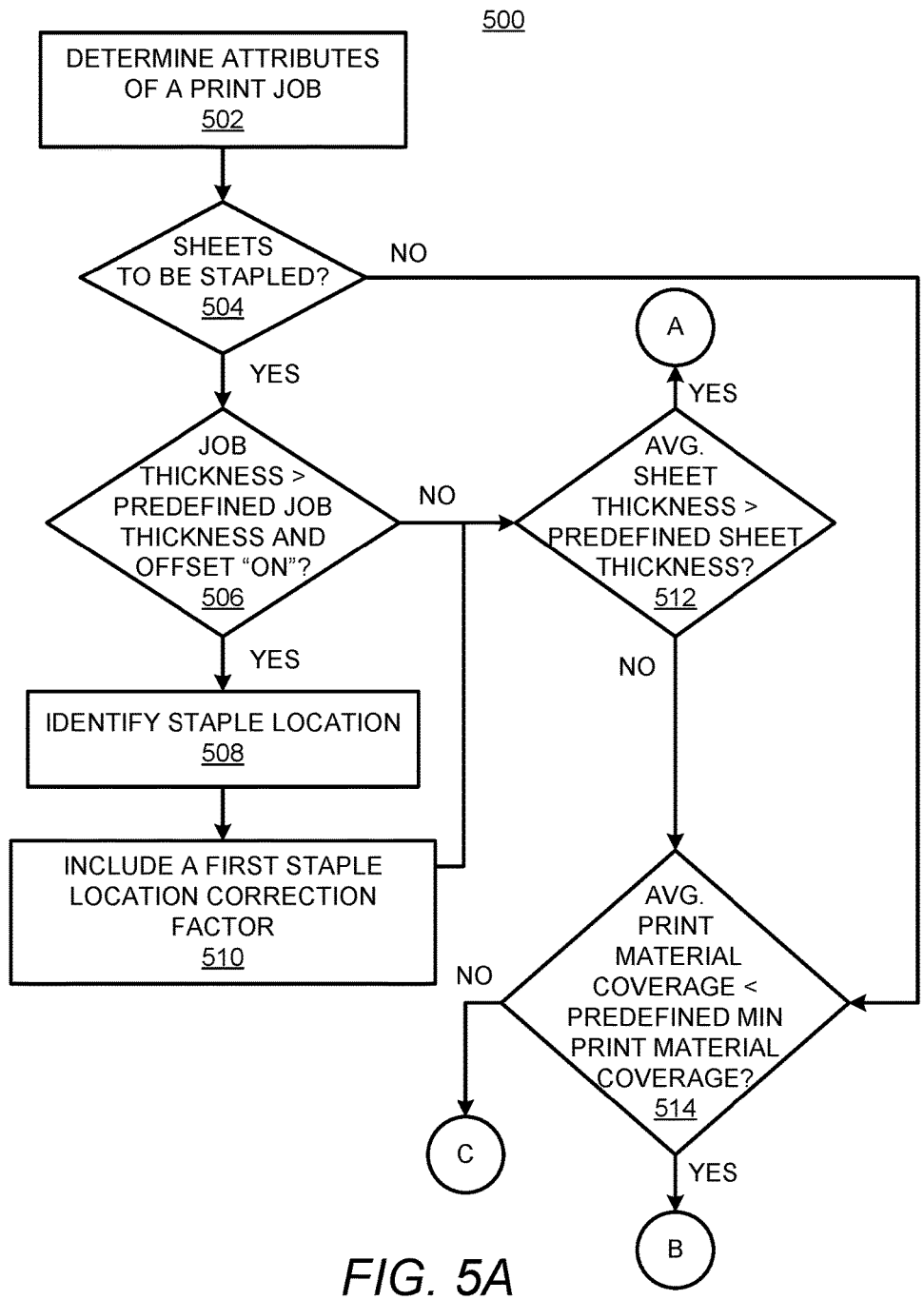
Figure 5B:
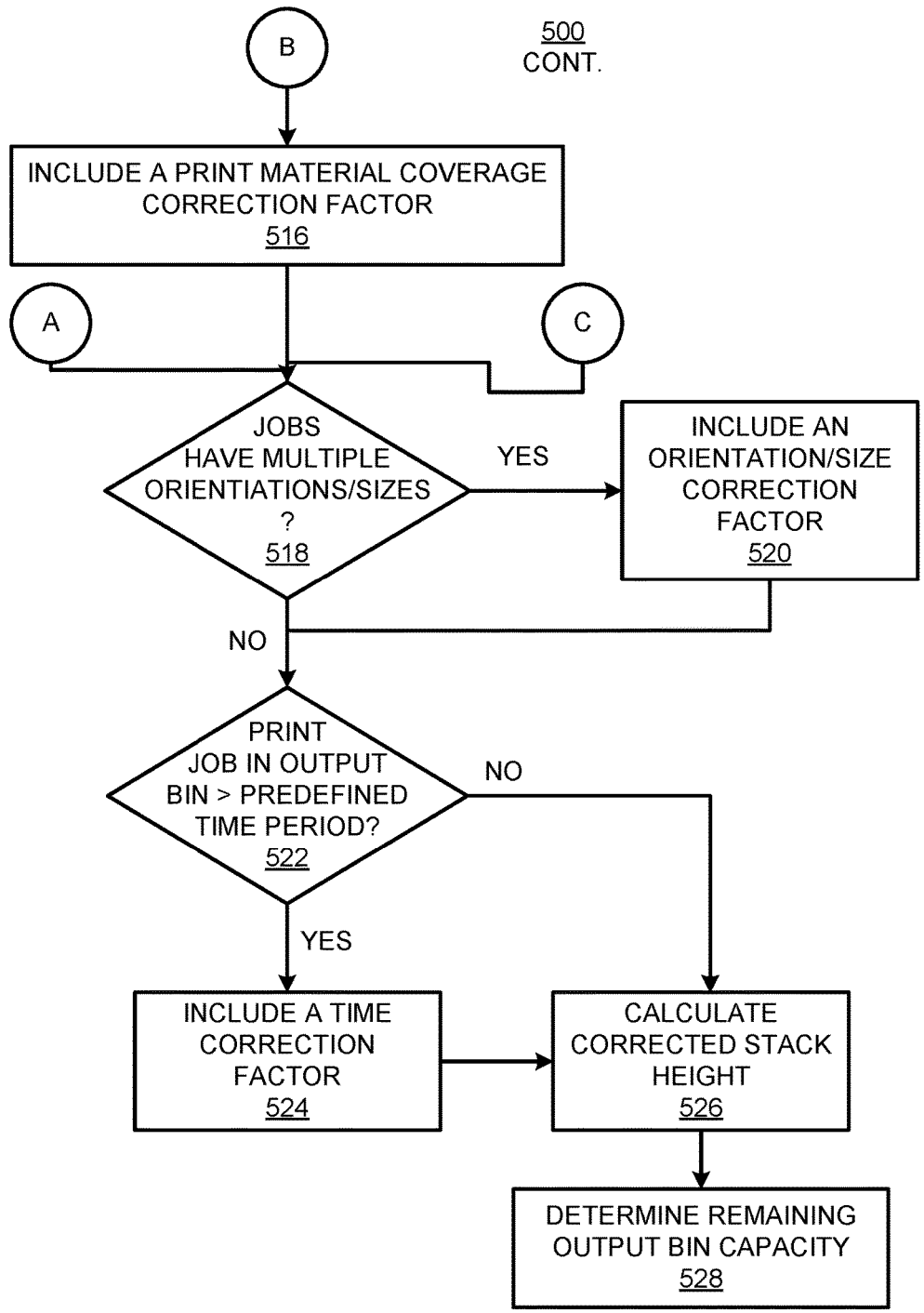

Various manners in which the processor 102, 302 may operate are discussed in greater detail with respect to the methods 400 and 500 depicted in FIGS. 4 and 5A-5B. Particularly, FIGS. 4 and 5A-5B, respectively, depict flow diagrams of example methods 400 and 500 for calculating a corrected stack height using an identified plurality of correction factors. It should be understood that the methods 400 and 500 depicted in FIGS. 4 and 5A-5B may include additional operations and that some of the operations described therein may be removed and/or modified without departing from the scopes of the methods 400 and 500. The descriptions of the methods 400 and 500 are made with reference to the features depicted in FIGS. 1-3 for purposes of illustration.

With reference first to FIG. 4, at block 402, the processor 102, 302 may determine attributes of a print job received in a printing system finishing apparatus 204. The attributes may include, for instance, a number of sheets in the print job, a job thickness of the print job, an average sheet thickness of the sheets in the print job, an average print material coverage on the sheets, whether the sheets are to be stapled together, etc.

At block 404, the processor 102, 302 may identify, based on the determined attributes of the print job, a plurality of correction factors to be applied in a calculation of a corrected stack height of sheets in an output bin 208. The plurality of correction factors may include an average print material coverage correction factor that compensates for print material coverage on sheets of the print job.

At block 406, the processor 102, 302 may calculate the corrected stack height of the sheets 206 in the output bin 208 using the identified plurality of correction factors. According to examples, the processor 102, 302 may add the identified plurality of correction factors to a measured stack height in the output bin 208 to calculate the corrected stack height. In one regard, the corrected stack height may compensate for curling in the sheets as well as other changes that may occur in the sheets 206 following the printing and drying of print material onto the sheets 206. The corrected stack height may also compensate for staples that may be included in the sheets 206.

Turning now to FIGS. 5A and 5B, at block 502, the processor 102, 302 may determine attributes of a print job received in a printing system finishing apparatus 204. The attributes may include, for instance, a number of sheets in the print job, a job thickness of the print job, an average sheet thickness of the sheets in the print job, an average print material coverage on the sheets, whether the sheets are to be stapled together, etc.

At block 504, the processor 102, 302 may determine whether the sheets 206 of the print job are to be stapled together. Based on a determination that the sheets of the print job are to be stapled together, the processor 102, 302 may determine whether the job thickness exceeds a predefined thickness level and whether a stapling offset on print jobs is activated as indicated at block 506. Based on a determination that the job thickness falls below the predefined thickness level and the stapling offset is activated, the processor 102, 302 may identify a staple location of a plurality of staple locations for the print job as indicated at block 508. In addition, at block 510, the processor 102, 302 may include a first staple location correction factor of a plurality of staple location correction factors for the print job as a factor in the identified plurality of correction factors.

However, based on a determination that the job thickness exceeding the predefined thickness level and/or the stapling offset is not activated, the processor 102, 302 may determine whether an average sheet thickness of the print job is greater than a predefined sheet thickness as indicated at block 512. The processor 102, 302 may also execute block 512 following block 510.

Based on a determination that the average sheet thickness is less than the predefined sheet thickness, the processor 102, 302 may determine whether the average print material coverage exceeds a predefined minimum print material coverage as indicated at block 514. In addition, based on a determination that the average print material coverage exceeds the predefined minimum print material coverage, the processor 102, 302 may include a print material coverage correction factor as a factor in the identified plurality of correction factors as indicated at block 516.

At block 518, which may follow any of blocks 512, 514, or 516, the processor 102, 302 may determine whether a plurality of print jobs in the output bin 208 are in multiple orientations and/or have multiple sizes. Based on a determination that the plurality of print jobs in the output bin 208 are in multiple orientations and/or have multiple sizes, the processor 102, 302 may include an orientation/size correction factor that compensates for different print job orientations/sizes as a factor in the identified plurality of correction factors, as indicated at block 520.

At block 522, which may follow either of blocks 518 or 520, the processor 102, 302 may determine whether the print job has been held in the output bin 208 beyond a predefined time period. Based on a determination that the print job has been held in the output bin 208 beyond the predefined time period, the processor 102, 302 may include a time correction factor that compensates for the print job being held on the output bin 208 beyond the predefined time period as a factor in the identified plurality of correction factors as indicated at block 524.

However, based on a determination that the print job has not been held in the output bin 208 beyond the predefined time period or after block 524, the processor 102, 302 may calculate the corrected stack height of the sheets in the output bin 208 using the identified plurality of correction factors as indicated at block 526. According to examples, the processor 102, 302 may add the identified plurality of correction factors to a measured stack height in the output bin 208 to calculate the corrected stack height. In addition, the processor 102, 302 may determine a remaining output bin 208 capacity at block 528.

In some instances, a user may remove a portion of the sheets in the output bin 208, which may cause inaccurate stack height calculations as the correction factors may be too high. In these instances, the processor 102, 302 may modify the correction factors applied in calculating the corrected stack height. Thus, for instance, instead of using all of the correction factors for each of the print jobs, the processor 102, 302 may modify the correction factors that are applied. For instance, the processor 102, 302 may reduce the correction factors according to the decrease in measured height, may cap the correction factors to limited values, or the like. In addition, the processor 102, 302 may use the modified correction factors to calculate the stack height before and/or after a next print job.

Some or all of the operations set forth in the methods 400 and 500 may be included as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Turning now to FIG. 6, there is shown an example non-transitory machine-readable storage medium 600 for calculating a corrected stack height through application of a plurality of correction factors to a measured stack height. The machine-readable storage medium 600 may be an electronic, magnetic, optical, or other physical storage device that contains or stores executable instructions. The machine-readable storage medium 600 may be, for example, Random Access memory (RAM), an Electrically Erasable Programmable Read-Only Memory (EEPROM), a storage device, an optical disc, and the like.

The non-transitory machine-readable storage medium 600 may have stored thereon machine readable instructions 602-612 that a processor, e.g., the processor 102, 302 may execute. The machine readable instructions 602 may cause the processor to determine a job thickness of a print job that includes sheets 206 of media. The machine readable instructions 604 may cause the processor to determine an average sheet thickness of the sheets in the print job. The machine readable instructions 606 may cause the processor to determine an average print material coverage on the sheets 206 in the print job. The machine readable instructions 608 may cause the processor to determine whether the sheets are to be stapled together.

The machine readable instructions 610 may cause the processor to identify, based on two or more of the determined job thickness, the determined average sheet thickness, the average print material coverage, and whether the sheets of the print job are to be stapled together, a plurality of correction factors to be applied in a calculation of a corrected stack height of print jobs in an output bin 208. The plurality of correction factors may include a staple correction factor, a staple location correction factor, a print material coverage correction factor, an orientation correction factor, a time correction factor, or the like. The machine readable instructions 612 may cause the processor to calculate the corrected stack height through application of the identified plurality of correction factors to a measured stack height in the output bin. As such, the processor may calculate the corrected stack height through application of a subset of a plurality of correction factors.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor;
   a memory on which are stored machine readable instructions that when executed by the processor, cause the processor to:
      determine a job thickness of a print job including sheets;
      determine an average sheet thickness of the sheets;

determine an average print material coverage on the sheets;

identify, based on the determined job thickness, the determined average sheet thickness, and the average print material coverage, a plurality of correction factors to be applied in a calculation of a corrected stack height of print jobs in an output bin; and apply the identified plurality of correction factors to a measured stack height in the output bin to calculate the corrected stack height.

2. The apparatus of claim 1, wherein the instructions are further to cause the processor to:

determine whether the sheets are to be stapled together;

based on a determination that the sheets are to be stapled together, determine whether the job thickness exceeds a predefined thickness level; and based on a determination that the job thickness falls below the predefined thickness level, include a staple correction factor that compensates for inclusion of a staple as a factor in the identified plurality of correction factors.

3. The apparatus of claim 1, wherein the instructions are further to cause the processor to:

determine whether the sheets are to be stapled together;

based on a determination that the sheets are to be stapled together, determine whether the job thickness exceeds a predefined thickness level and whether a stapling offset on print jobs is activated; and based on a determination that the job thickness falls below the predefined thickness level and the stapling offset is activated, identify a staple location of a plurality of staple locations for the print job; and include a first staple location correction factor of a plurality of staple location correction factors for the print job as a factor in the identified plurality of correction factors.

4. The apparatus of claim 1, wherein the instructions are further to cause the processor to:

determine whether the average sheet thickness is greater than a predefined sheet thickness; and based on a determination that the average sheet thickness is less than the predefined sheet thickness, determine whether the average print material coverage falls below a predefined minimum print material coverage;

based on a determination that the average print material coverage exceeds the predefined minimum print material coverage, include a print material coverage correction factor that compensates for print material coverage as a factor in the identified plurality of correction factors.

5. The apparatus of claim 4, wherein the instructions are further to cause the processor to:

determine an average speed at which the sheets moved through a printing system; and determine the average print material coverage from the determined average speed based on a predetermined correlation between the average speed and the average print material coverage.

6. The apparatus of claim 4, wherein the instructions are further to cause the processor to:

determine whether a plurality of print jobs in the output bin are in multiple orientations; and based on a determination that the plurality of print jobs in the output bin are in multiple orientations, include an orientation correction factor that compensates for different print job orientations as a factor in the identified plurality of correction factors.

7. The apparatus of claim 1, wherein the instructions are further to cause the processor to:

access the measured stack height;

sum the identified plurality of correction factors to the measured stack height to apply the identified plurality of correction factors to the measured stack height; and determine a remaining capacity available in the output bin to receive a next print job.

8. The apparatus of claim 1, wherein the instructions are further to cause the processor to:

determine whether the print job has been held in the output bin beyond a predefined time period; and based on a determination that the print job has been held in the output bin beyond the predefined time period, include a time correction factor that compensates for the print job being held on the output bin beyond the predefined time period as a factor in the identified plurality of correction factors.

9. A method comprising:

determining, by a processor, attributes of a print job received in a printing system finishing apparatus;

identifying, by the processor, based on the determined attributes of the print job, a plurality of correction factors to be applied in a calculation of a corrected stack height of sheets in an output bin, the plurality of correction factors including an average print material coverage correction factor that compensates for print material coverage on sheets of the print job; and calculating the corrected stack height of the sheets in the output bin using the identified plurality of correction factors.

10. The method of claim 9, further comprising:

determining whether the sheets of the print job are to be stapled together;

based on a determination that the sheets are to be stapled together, determining whether job thickness exceeds a predefined thickness level and whether a stapling offset on print jobs is activated; and based on a determination that the job thickness falls below the predefined thickness level and the stapling offset is activated, identifying a staple location of a plurality of staple locations for the print job; and including a first staple location correction factor of a plurality of staple location correction factors for the print job as a factor in the identified plurality of correction factors.

11. The method of claim 9, further comprising:

determine whether an average sheet thickness of the print job is greater than a predefined sheet thickness;

based on a determination that the average sheet thickness is less than the predefined sheet thickness, determining whether the average print material coverage falls below a predefined minimum print material coverage; and based on a determination that the average print material coverage exceeds a predefined minimum print material coverage, including a print material coverage correction factor as a factor in the identified plurality of correction factors.

12. The method of claim 11, further comprising:

determining whether a plurality of print jobs in the output bin are in multiple orientations and/or have multiple sizes; and based on a determination that the plurality of print jobs in the output bin are in multiple orientations and/or have multiple sizes, including an orientation/size correction factor that compensates for different print job orientations/sizes as a factor in the identified plurality of correction factors.

13. The method of claim 9, further comprising:
determining whether the print job has been held in the output bin beyond a predefined time period; and
based on a determination that the print job has been held in the output bin beyond the predefined time period, including a time correction factor that compensates for the print job being held on the output bin beyond the predefined time period as a factor in the identified plurality of correction factors.

14. A non-transitory computer readable medium on which is stored machine readable instructions that when executed by a processor, cause the processor to:
determine a job thickness of a print job including sheets;
determine an average sheet thickness of the sheets;
determine an average print material coverage on the sheets;
determine whether the sheets of the print job are to be stapled together;
identify, based on two or more of the determined job thickness, the determined average sheet thickness, the average print material coverage, and whether the sheets of the print job are to be stapled together, a plurality of correction factors to be applied in a calculation of a corrected stack height of print jobs in an output bin; and
calculate the corrected stack height through application of the identified plurality of correction factors to a measured stack height in the output bin.

15. The non-transitory computer readable medium of claim 14, wherein the plurality of correction factors includes a staple correction factor, a staple location correction factor, a print material coverage correction factor, an orientation correction factor, and a time correction factor, and wherein the instructions are further to cause the processor to calculate the corrected stack height through application of a subset of the plurality of correction factors.

\* \* \* \* \*

UNITED STATES PATENT AND TRADEMARK OFFICE
CERTIFICATE OF CORRECTION

PATENT NO.         : 10,406,844 B1
APPLICATION NO.    : 15/967422
DATED              : September 10, 2019
INVENTOR(S)        : Alan Hayes et al.

Page 1 of 1

It is certified that error appears in the above-identified patent and that said Letters Patent is hereby corrected as shown below:

In the Drawings

In sheet 6 of 7, FIG. 5B, reference numeral 518, Line 3, delete "ORIENTIATIONS" and insert -- ORIENTATIONS --, therefor.

Signed and Sealed this
Seventeenth Day of March, 2020

Andrei Iancu
*Director of the United States Patent and Trademark Office*